United States Patent
Zoppi et al.

(10) Patent No.: US 9,089,973 B2
(45) Date of Patent: Jul. 28, 2015

(54) GRIPPER

(71) Applicants: Matteo Zoppi, Genoa (IT); Rezia Molfino, Genoa (IT); Michal Jilich, Genoa (IT); Thuy Hong Loan Le, Genoa (IT)

(72) Inventors: Matteo Zoppi, Genoa (IT); Rezia Molfino, Genoa (IT); Michal Jilich, Genoa (IT); Thuy Hong Loan Le, Genoa (IT)

( * ) Notice: Subject to any disclaimer, the term of this patent is extended or adjusted under 35 U.S.C. 154(b) by 0 days.

(21) Appl. No.: 14/182,905

(22) Filed: Feb. 18, 2014

(65) Prior Publication Data
US 2014/0232125 A1    Aug. 21, 2014

(30) Foreign Application Priority Data
Feb. 19, 2013    (IT) .............. GE2013A0023

(51) Int. Cl.
| | | |
|---|---|---|
| *B25J 15/02* | (2006.01) | |
| *B25J 15/00* | (2006.01) | |
| *D06F 89/00* | (2006.01) | |
| *D06F 95/00* | (2006.01) | |

(52) U.S. Cl.
CPC .......... *B25J 15/0028* (2013.01); *B25J 15/0206* (2013.01); *D06F 89/00* (2013.01); *D06F 95/00* (2013.01)

(58) Field of Classification Search
CPC .. B25J 15/0028; B25J 15/0206; B25J 15/022; D06F 89/00; D06F 95/00
USPC ........ 294/86.4, 106, 198, 202, 205, 115, 902, 294/907; 901/33, 39, 46
See application file for complete search history.

(56) References Cited

U.S. PATENT DOCUMENTS

| | | | | | |
|---|---|---|---|---|---|
| 2,226,652 | A | * | 12/1940 | York | 294/68.26 |
| 3,363,929 | A | * | 1/1968 | Nelson | 294/198 |
| 4,366,606 | A | * | 1/1983 | Willis et al. | 269/218 |
| 4,368,913 | A | * | 1/1983 | Brockmann et al. | 294/106 |
| 4,647,097 | A | * | 3/1987 | Lessway | 294/195 |
| 4,728,137 | A | * | 3/1988 | Hamed et al. | 294/202 |
| 4,784,422 | A | * | 11/1988 | Jones et al. | 294/106 |
| 4,871,206 | A | | 10/1989 | Gazzarrini | |
| 5,200,679 | A | * | 4/1993 | Graham | 318/568.16 |
| 5,501,498 | A | * | 3/1996 | Ulrich | 294/106 |
| 6,056,341 | A | * | 5/2000 | Bliss | 294/198 |
| 2008/0007076 | A1 | * | 1/2008 | Curley | 294/106 |

FOREIGN PATENT DOCUMENTS

| | | |
|---|---|---|
| JP | S529262 | 1/1977 |
| JP | S61219540 | 9/1986 |
| WO | 8707127 | 12/1987 |

* cited by examiner

*Primary Examiner* — Dean Kramer
(74) *Attorney, Agent, or Firm* — Themis Law

(57) ABSTRACT

A gripper for grasping and handling textiles and other flexible materials includes an external body housing a driving unit, which actuates a plurality of sliding elements moving away and approaching symmetrically; and a plurality of gripping members, each connected to one of the sliding elements by a first transmission group that includes a kinematic chain with levers that invert motion such that, during the approaching of the sliding elements, the gripping members move away from each other, and during the distancing of the sliding elements, the gripping members approach each other.

11 Claims, 8 Drawing Sheets

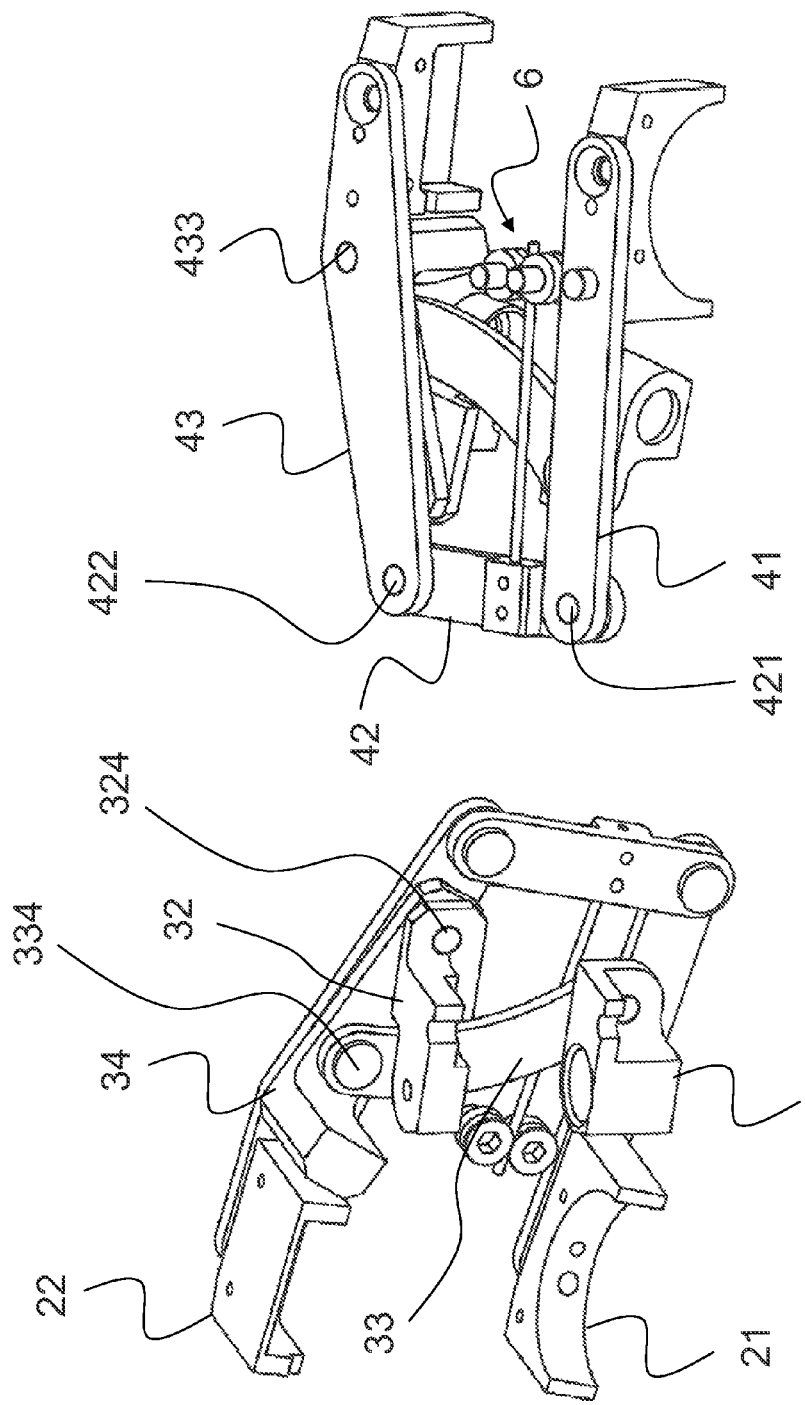

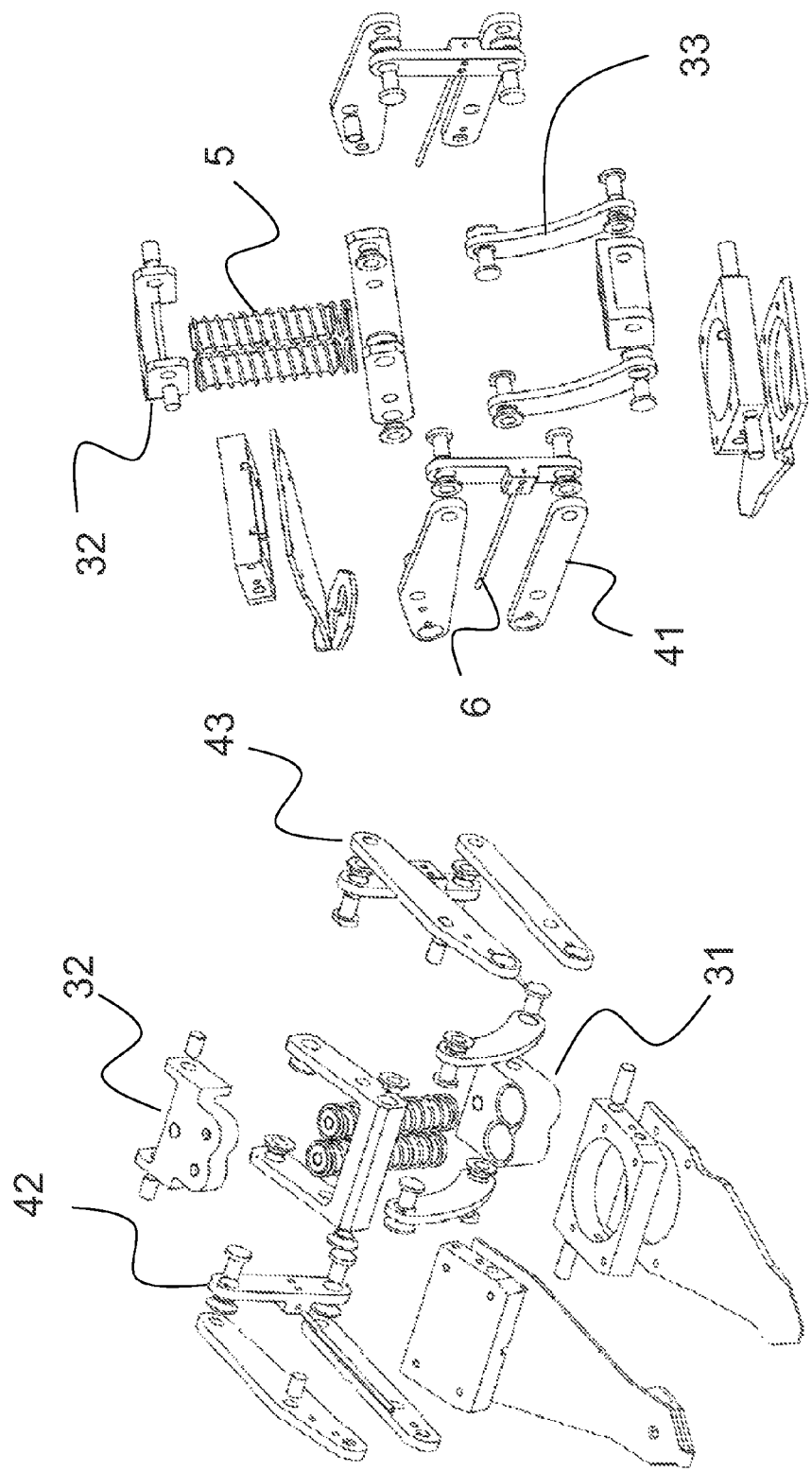

Fig. 5

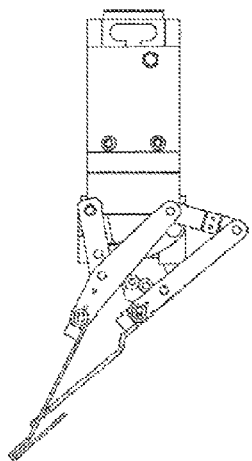
Fig. 6d
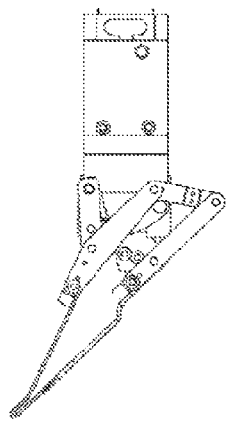
Fig. 6e
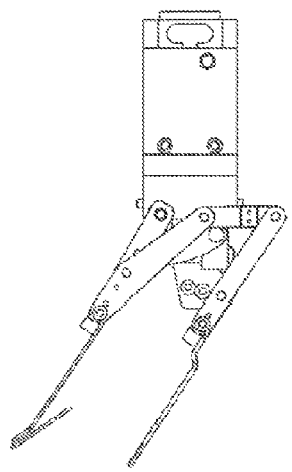
Fig. 6f
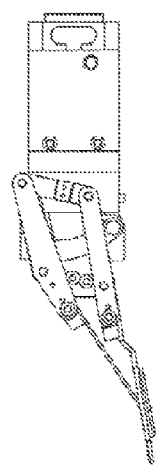
Fig. 6a
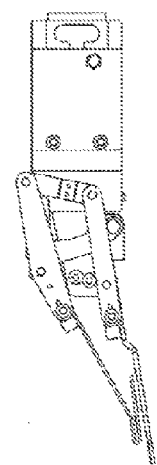
Fig. 6b
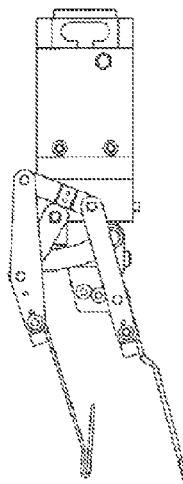
Fig. 6c
Fig. 6

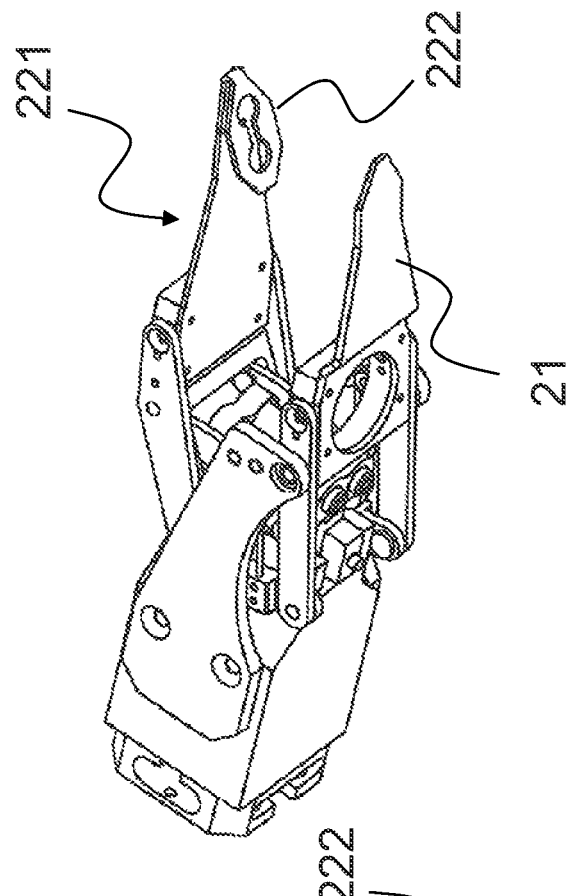
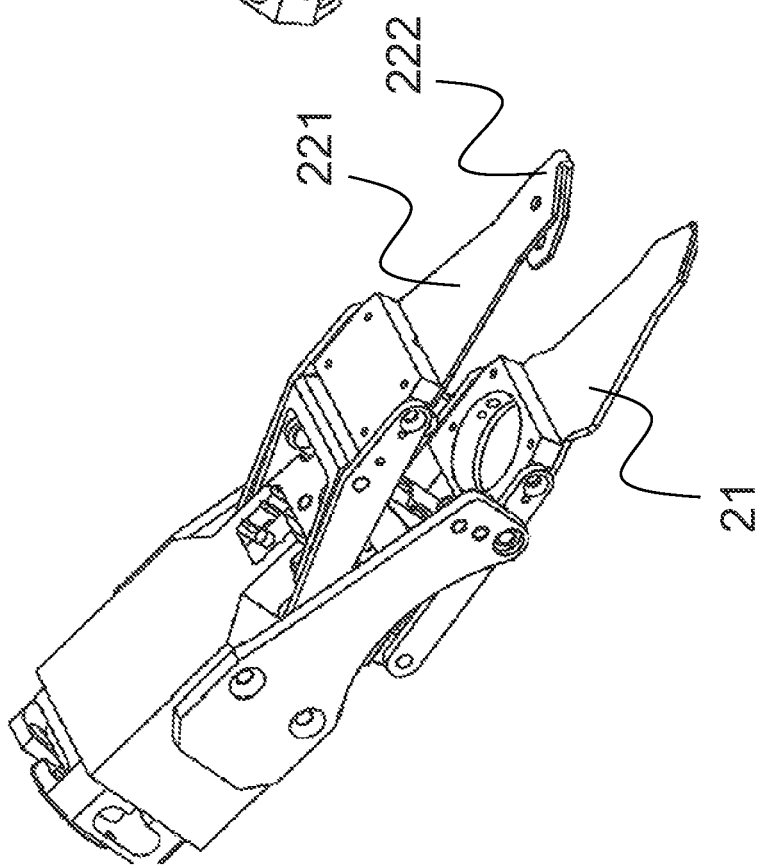
Fig. 7b
Fig. 7a

GRIPPER

FIELD OF THE INVENTION

The present invention relates to a gripper having an external body, in which a driving unit is housed. This driving unit actuates a plurality of sliding elements according to a translational motion, such that the sliding elements move away from and approach each other in a symmetric manner with respect to a longitudinal mid-plane of the gripper, passing from a maximum mutual approach condition to a maximum mutual spacing condition. A plurality of gripping members are also included, each connected to one of the sliding elements.

BACKGROUND OF THE INVENTION

In general terms, the above described architecture described is a common architecture of industrial grippers according to the state of the art.

Different types of industrial grippers exist and can be classified mainly based on two characteristics: the displacements of the rotary or sliding fingers of the gripper, and the force that the fingers apply to the grasped body.

Following the above classification, industrial grippers can be divided in translational grippers and rotational grippers.

Translational grippers comprise two fingers that translate, generally along a guide. It is typical of translational gripper to provide a high grasping force and small displacements. For larger displacements the size of the gripper must be increased.

Rotational industrial grippers comprise two fingers hinged to the gripper body. These fingers can open and close to grasp a body.

The displacement, in this case, can be adjusted on the base of the length of the fingers but the parts of the fingers in contact with the grasped body do not undergo a translational motion and the contact between fingers and body is not uniform. This can be a drawback for several practical applications of the gripper.

SUMMARY OF THE INVENTION

A gripper according to the present invention can be preferably used for manipulating of parts made of textiles, leather or similar soft materials, hence having deformable bodies without a predefined geometric shape.

Such gripper can be, for example, used in an automatic system for the handling and manipulation of a laundry load.

Such an automatic system may comprise one or more grippers operated by one or more robotic arms, commercial or derived from industrial arms.

The robot is in charge of the handling of, for example, a garment. It grasps the garment by means of the grippers and may execute different motion tasks with the aim of recognizing the type of garment.

The garment is suitably manipulated by the robot to collect images of it from different lines of view, in such a way that the robot can recognize the type of garment and consequently lay it down on a table and prepare for folding.

It is clear from the above description that the above mentioned grippers according to the state of the art do not fulfill the requirements for manipulating garments and similar soft materials.

An aim of the present invention is providing a gripper suitable for the manipulation of soft and nonrigid bodies as described above. This gripper should be produced from components that are easy to industrialize, and its manufacturing cost should be low and its size small.

The present invention meets the above objectives by providing a gripper as described hereinafter. In this gripper, each of at least two gripping means or members is connected to a corresponding sliding element through a first transmission group of the translational motion from the sliding elements to the gripping means.

The first transmission group includes of a kinematic chain with levers that invert the motion in such a way that, during the approaching condition of the two sliding elements, the two gripping means move away from each other and, during the spacing condition of the two sliding elements, the two gripping means approach each other, being the mutual spacing/approaching of the gripping means realized with respect to the aforementioned mid-plane.

Preferably, a spring or similar elastic element is used, positioned between the two sliding elements. This elastic element is in a configuration of maximum compression when the distance between the sliding elements is at a minimum. It is in a configuration of minimum or null compression when the distance between the sliding elements is at a maximum.

This feature is especially relevant for the handling of garments, because it allows an increase in the grasping force of the gripper while the power of the driving unit that moves the sliding elements does not change.

The grippers according to the state of the art are characterized by the same force at the fingers either at opening and closing, since they may be suitable for of concave and convex rigid bodies, for instance, cylinders that are grasped by the fingers performing a motion of closure, or hollow bodies with the shape of a cup that can be grasped by the fingers performing a motion of opening.

The handling of garments does not require finger opening force, only finger closing force (to grasp the garment). The finger opening force is used by the first transmission group to deform the elastic element during the opening of the gripper. During the closing of the gripper, the force of the deformed elastic element adds up to the finger closing force, increasing the total grasping force of the gripper at same size of the driving unit. The size of the gripper is thereby optimized.

The sliding elements in the driving unit approach to each other, compress the elastic element and transmit their motion to the gripping means through the first transmission group. The gripping means undergo an opening motion.

The gripping means close when the sliding elements move away from each other. The closing force on the gripping means is the sum of the contribution of the opening force of the sliding elements with the force of the elastic element that recovers its deformation.

In one embodiment of the invention, a second transmission group is present. This second transmission group is connected and driven by the first transmission group. The gripping means are connected and driven by the second transmission group instead of the first transmission group.

The second transmission group is connected to the first transmission group by means of revolute joints, in such a way that the second transmission group can rotate with respect to the first transmission group about an axis parallel to a longitudinal mid-plane of the gripper.

Furthermore, the second transmission group comprises a kinematic chain that generates a relative motion of the gripping means at least in a direction parallel to the mid-plane.

As further clarified in the examples that follow, the links belonging to the kinematic chains of the first and second transmission group are parallel to a pivoting-plane perpendicular to the mid-plane. The axes of the revolute joints in the kinematic chains are perpendicular to the pivoting-plane and parallel to the mid-plane.

The second transmission group is connected to the external body through a support frame.

The presence of the second transmission group connected in series to the first transmission group provides a gripper according to the present invention with a degree of compliance, which is especially useful and required for the application of the gripper.

As discussed above, for the execution of tasks of grasping and handling garments, the gripper can be mounted on a robotic arm, which moves it within an environment. The robot can use visual sensors to see the environment, plan the motions and execute trajectories and other motion tasks.

The robotic arm is generally stiff. The overall accuracy is generally coarse. In particular, especially if moving on visual feedback in real time, geometric errors of the order of magnitude of the centimeter may be expected on the estimate of the coordinates of a point in the environment.

The first transmission group is jointed rigidly to the robotic arm structure carrying the gripper. The second transmission group provides for a motion allowance (a compliance) of the gripping means with respect to the first transmission group. With this arrangement, in case of collision of the gripping means of the gripper with rigid objects in the environment, for instance the table or floor where the garment lies on and from which it is picked, the force of collision is low due to the available motion allowance.

The compliance of the gripper object of the present invention, provided by the above described architecture, is also useful for preventing the tearing of the handled garment. Since the robot arm and the garment are relatively stiff, any small geometric error during manipulation causing a stretch of the garment would result in a high force applied to the garment. Wth the aforementioned motion allowance (compliance), the stretching force stays low.

As an improvement, one or both of the two gripping means comprises a sensor positioned at the surface of contact of the two gripping means.

Such sensor is suitable to sense and identify the roughness of the material or textile of which the garment is made. It can also sense the presence of, for instance, buttons, button holes, or stitches.

It is a feature of the gripper to present a certain compliance obtained by means of kinematic chains.

The compliance of the gripper, required by the tasks to be performed, is obtained by means of kinematic chains that allow, on one hand, a relative motion between the gripping means and the first transmission group and, on the other hand and together, a relative motion between the gripping means. This relative motion gives to the gripper the possibility to recognize the type of handled material by means of sensors.

The gripping means operate like the fingers of a human hand when a person, in order to understand the roughness of a material, rubs the fingertips over a portion of material held in the hand, performing forward and backward sliding motions, typically with the thumb on one side and the index and medium fingers on the other side.

With reference to the above similarity, in a gripper according to the present invention, the gripping means represent the fingers and the sensors represent the fingertips.

Furthermore, all of the aforementioned features become convenient thanks to the embodiment of the kinematic chains of the first and second transmission groups described in greater detail below.

Moreover, in these embodiments, the architectures of these kinematic chains make it easy to assemble and disassemble them on industrial grippers according to the state of the art.

In particular, the first transmission group consists of two parts, symmetrical with respect to a plane perpendicular to the mid-plane. Each part consists of two opposed brackets that are driven by the two sliding elements, one bracket for each sliding element.

The first bracket is connected to a third bracket which is linked, at one end, to a fourth bracket of motion output. This bracket of motion output is linked to the second bracket of motion input in such a way that the bracket of motion output rotates with respect to the second bracket along a rotation axis perpendicular to the pivoting plane.

In a special embodiment, also the second transmission group consists of two parts, symmetrical with respect to a plane perpendicular to the mid-plane.

Each part consists of three brackets of which a sixth, a seventh and an eighth bracket, in such a way that the seventh bracket is connected at its two extremities to one extremity of the sixth bracket and one extremity of the eight bracket respectively.

Moreover, the sixth bracket is connected in rotation to the support frame, while the eight bracket is connected in rotation to the output bracket of the first transmission group; the gripping means are connected to the sixth bracket and eight bracket, respectively.

In one embodiment of the actuation system, the second transmission group comprises at least one elastic element, connected to the seventh bracket and to the support frame, which regulates the relative motion between the two gripping means.

The presence of the elastic element makes it also possible to adjust the compliance of a gripper according to the present invention. The advantages of this compliance are described above and this compliance has also an effect on the rubbing motion.

Furthermore, the motion of rubbing can be passive, or it is possible to introduce an actuation device positioned between the second transmission group and the support frame. This actuation device is configured to regulate the relative motion between the two gripping means.

In another embodiment of the present invention, the gripping means are made of two plates. The first plate extends with a specific inclination with respect to the mid-plane. The second plate comprises a first part and a second part; the first part is connected to the second part. The second part extends in the direction of the first plate; the angle that the second part forms with the mid-plane is different from the angle that the first part forms with the mid-plane, in such a way that, during the approaching condition of the two aforementioned gripping means, the second part is parallel to the abovementioned first plate.

Having two parallel surfaces at the extremities of the gripping means provides for an optimization of the area of detection of the sensors positioned on the gripping means, since with this arrangement the area of detection of the sensors is in full contact with the textile or other material to be sensed.

In one embodiment of the present invention, the second part of the second plate consists of a plate folded on itself, with a bending angle equal or higher than 180 degrees, such to maintain the parallelism of the plate to the corresponding portion of the other gripping means.

Since the gripping means are preferably made of metal or other elastic material, this folding gives compliance to the gripping means. With this compliance, the gripping means assist in making a uniform contact pressure during the closing of a gripper according to the present invention.

BRIEF DESCRIPTION OF THE DRAWINGS

These and other characteristics of the present invention will be further clarified by the following description of a few embodiments of the present invention, represented in the enclosed drawings.

FIGS. 3a and 3b provide two details of the first and second transmission groups;

FIGS. 4b and 4c show an exploded view of FIG. 4a;

FIG. 6 shows the motion of rubbing performed by a gripper according to the present invention;

FIGS. 7a and 7b show two axonometric views of a gripper according to the present invention, with the aim of highlighting a detail of the gripping means of the gripper.

DETAILED DESCRIPTION OF EMBODIMENTS OF THE INVENTION

Figure 1:
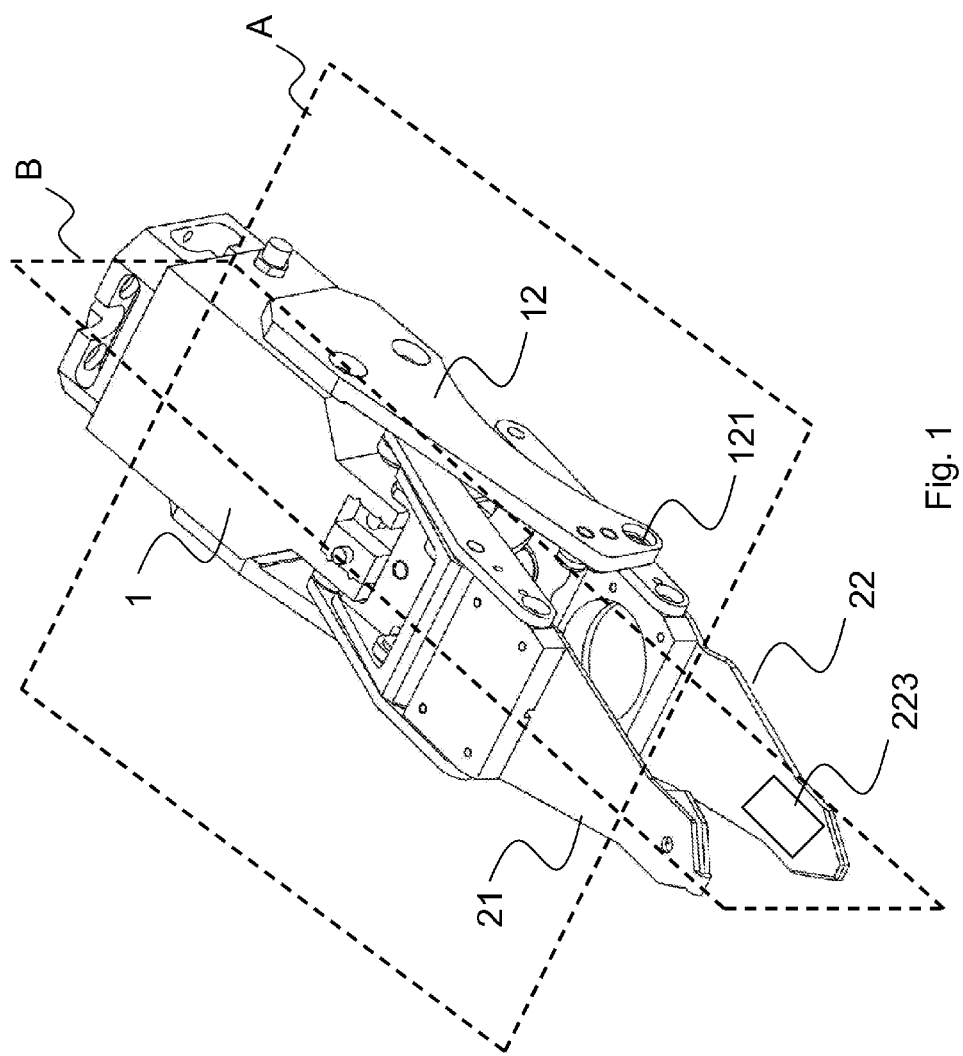
FIG. 1 shows an axonometric view of a gripper according to the present invention.

The below described pictures relate to a preferred embodiment of a gripper according to the present invention. They are shown with the aim to clarify and not limit the scope and breadth of the invention, which covers the realization of a gripper for manipulating objects with irregular or deformable geometry, with the advantageous characteristics that were described previously.

With reference to the figures, a gripper according to the present invention comprises an external body 1, in which at least one driving unit is present. This driving unit moves at least two sliding elements 11 according to a motion of translation, in such a way that the at least two sliding elements 11 move away from and approach each other symmetrically with respect to a longitudinal mid-plane A of the gripper, passing from a configuration of maximum mutual approach to a configuration of maximum mutual spacing.

The motion of the sliding elements 11 actuates the opening and closing of the gripping means or members 21 and 22, each one connected to one of the two sliding elements 11.

Each of the at least two gripping means 21 and 22 is connected to one corresponding sliding element 11 through a first transmission group of the translation motion, which transmits the translational motion of the two sliding elements 11 to the gripping means 21 and 22.

The first transmission group consists of a kinematic chain with levers that invert the motion, in such a way that, during the approaching condition of the two sliding elements 11, the two gripping means 21 and 22 move away from each other and during the spacing condition of the two said sliding elements 11 the two gripping means 21 and 22 approach each other.

As one may see in FIG. 1, the mutual spacing/approaching of the two gripping means 21 and 22 is realized with respect to the mid-plane A.

Figure 4A:
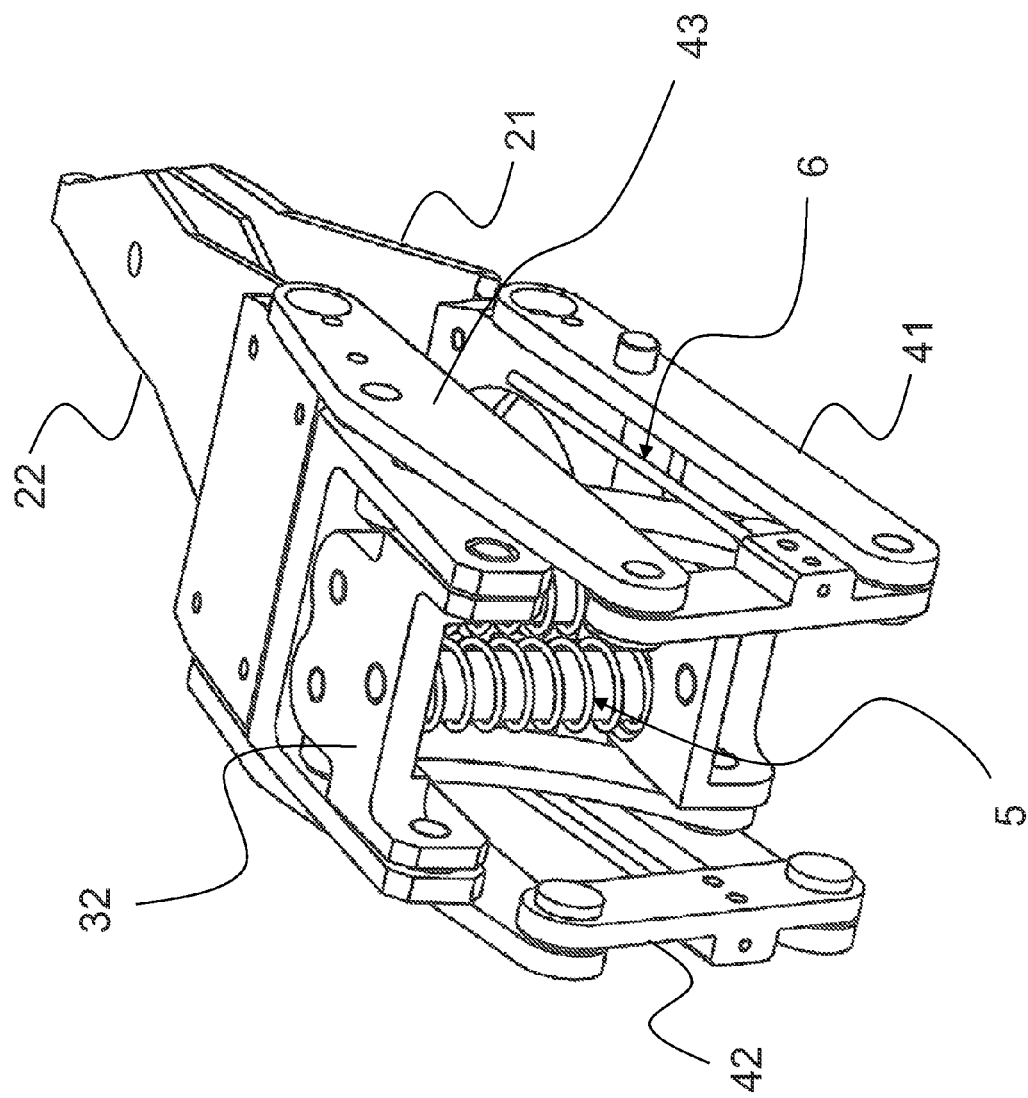
FIG. 4a shows an axonometric view of the components of a gripper according to the present invention, which are assembled onto a gripper according to the state of the art.
Figure 5A:
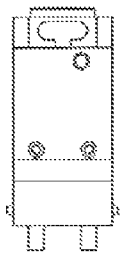
FIG. 5 shows the different configurations of spacing/approaching of the components of a gripper according to the present invention.
Figure 5B:
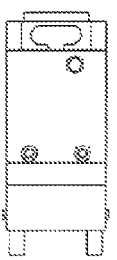
Figure 5C:
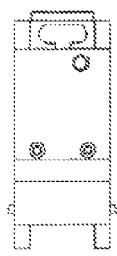
Figure 5D:
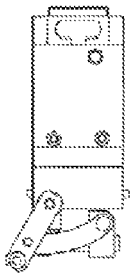
Figure 5E:
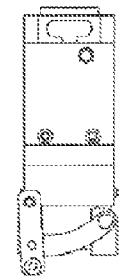
Figure 5F:
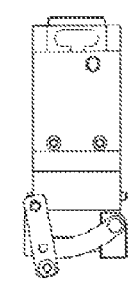
Figure 5G:
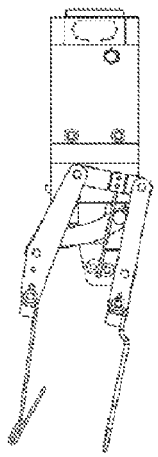
Figure 5H:
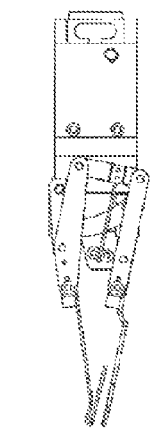
Figure 5I:
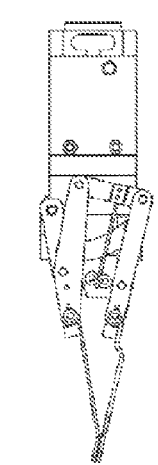

At least one spring or a similar elastic element 5 may be used (FIGS. 4a, 4b, 4c), positioned between the two sliding elements 11. The elastic element 5 presents a condition of maximum compression corresponding to the maximum approach condition of the two sliding elements 11, and a condition of maximum extension corresponding to the condition of maximum spacing of the two sliding elements 11.

An embodiment of the present invention with a special actuation comprises a second transmission group positioned between the first transmission group and the two gripping means 21 and 22.

The second transmission group is connected to the first transmission group through revolute joints, such that the second transmission group has a rotation with respect to the first transmission group according to an axis parallel to the mid-plan A.

The second transmission group consists of a kinematic chain, in which the levers work in such a way as to obtain a relative motion between the gripping means at least in a direction parallel to the mid-plane A.

The levers of the first transmission group and the levers of the second transmission group are co-planar along a pivoting plane B, presenting hence their respective pivoting axis parallel to each other, perpendicular to the pivoting plane B and parallel to the mid-plane A.

The second transmission group is connected to the external body 1 through a support frame 12.

Figure 2:
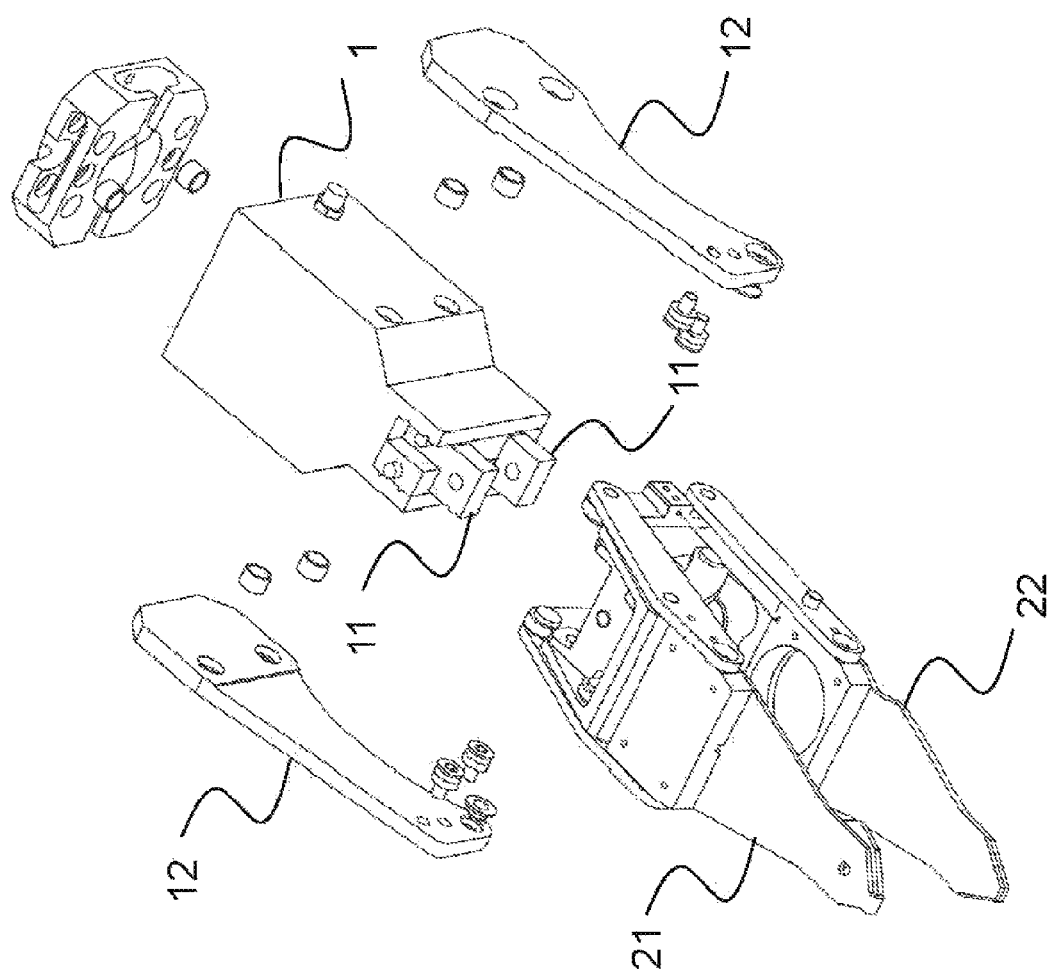
FIG. 2 shows an exploded view of FIG. 1.

As shown in the figures, especially in FIGS. 1 and 2, the gripper object of the present invention comprises a body 1, and two transmission groups assembled on the body 1. The two transmission groups transmit the motion of the sliding elements 11 to the gripping means 21 and 22.

FIGS. 3a and 3b show details of the first and second transmission group as seen with a sectioning plane parallel or coincident with the pivoting plane B.

In the figures, the first transmission group and the second transmission group consist of two parts symmetrical with respect to a plane coincident with or parallel to the pivoting plane B and perpendicular to the above mentioned mid-plane A.

Consequently, FIG. 3a shows a section of the first transmission group comprising two opposed brackets 31 and 32 of motion input of the two said sliding elements 11, coupled to a first bracket 31 and a second bracket 32, each of which is fixed to one of the two sliding elements 11.

The first bracket 31 is connected to a third bracket 33 linked from its end to a fourth bracket 34 of motion output. The bracket 34 of motion output is linked to the second bracket 32 of motion input, in such a way that the bracket 34 rotates with respect to the second bracket 32 about a rotation axis perpendicular to the pivoting plane B.

FIG. 3a shows how the first transmission group works: when the distance between the sliding elements 11 increases, the brackets 31 and 32, fixed to the sliding elements, increase their distance as well.

The bracket 31 pulls the output bracket 34 thanks to the joint 334 of the bracket 33. The bracket 33 is hinged at one extremity to the bracket 31.

The bracket 34 is pulled and at the same time turns about the hinge that connects it to the bracket 32.

Consequently, the increase in the distance between the brackets 31 and 32 fixed to the sliding elements 11 causes the reduction of the distance between the brackets 21 and 22.

FIG. 3b shows the second transmission group comprising three brackets 41, 42 and 43, which include a sixth bracket 41, a seventh bracket 42 and a eighth bracket 43, with the seventh bracket 42 joined at its two extremities to one extremity of the sixth bracket and to one extremity of the seventh bracket, respectively by the joints 421 and 422.

The bracket 41 is hinged to the support frame 12, while the bracket 43 is hinged to the output bracket 34 of the first transmission group by the joint 433. The two gripping means 21 and 22 are connected respectively to the brackets 41 and 43.

Furthermore, in FIG. 3b an elastic element such as a cantilever beam 6 is shown. This elastic element is connected to the bracket 42 and to the support frame 12, in such a way that it can regulate the relative motion between the gripping means 21 and 22.

As shown in FIGS. 1 and 2, a gripper according to the present invention consists of the assembly of two transmission groups and of the gripping means 21 and 22 connected to the body 1 of the driving unit.

The assembly of the two transmission groups and of the gripping means 21 and 22 is joined to the body 1, since the brackets 31 and 32 are connected to the sliding elements 11, while the second transmission group is joined only by the bracket 41 to the support frame 12, which is connected to the body 1.

This particular architecture allows the oscillation of the second transmission group. The gripping means 21 and 22 move with the second transmission group about the axis 121 regardless the condition of spacing or approaching of the sliding elements 11.

Moreover, the gripping means 21 and 22 may present a relative displacement, one with respect to the other, thanks to the architecture of the second transmission group and to the presence of the elastic element 6.

This relative displacement, which, as described above, enables the generation of a motion known as motion of rubbing, can be passive or active. It can be passive using the elastic element 6; it can be active in the variant of the present invention using an actuation device between the second transmission group and the support frame 12.

FIG. 6 explains this motion of rubbing showing the configurations of maximum downward angular displacement of the gripping means (FIGS. 6a, 6b and 6c), and maximum upward angular displacement of the gripping means (FIGS. 6d, 6e and 6f). In FIGS. 6a and 6d the gripper is also with the gripping means 21 and 22 in closed configuration; in FIGS. 6b and 6e the gripper is also with the gripping means 21 and 22 in an intermediate configuration between closed and open; in FIGS. 6c and 6f the gripper is also with the gripping means 21 and 22 in open configuration.

FIG. 5 shows the movements of the different components belonging to a gripper according to the present invention. The displacements of the sliding elements 11 are shown in FIGS. 5a, 5b and 5c; the displacements of the first transmission group are shown in FIGS. 5d, 5e and 5f; the displacements of the entire gripper are shown in FIGS. 5g, 5h and 5i. In FIGS. 5a, 5d and 5g, the sliding elements 11 are in the configuration of maximum distance; in FIGS. 5b, 5e and 5h, the sliding elements 11 are at an intermediate distance; in FIGS. 5c, 5f and 5i, the sliding elements 11 are at minimum distance.

Note that the elastic element 5, used to increase the grasping force between the gripping means 21 and 22, can be positioned either between the sliding elements 11 or, as shown in FIG. 4b, between the brackets 31 and 32, which are rigidly connected to the sliding elements 11.

In the second case, the elastic elements 5 can be two and can be positioned in suitable rooms or attachments present in the brackets 31 and 32.

The gripping means 21 and 22 may have plate shapes. One gripping means is realized as a first plate, which extends with a specific inclination with respect to the mid-plane A. The second gripping means is realized as a second plate comprising a first part 221 and a second part 222. The first part 221 extends in the direction of the first plate, and this first part is connected to the second part 222. The second part has an inclination different from the one of the first part 221 with respect to the mid-plane A, in such a way that, during the approaching condition of the two gripping means 21 and 22, the second part 222 is parallel to the first plate.

FIGS. 7a and 7b show an embodiment of the gripping means, where the second part 222 is a plate folded on itself.

As shown in the FIGS. 7a and 7b, the plate of the gripping means is folded on itself with a bending angle equal to or larger than 180 degrees, such to maintain in parallel position the extremities of the two gripping means 21 and 22.

Finally, in one embodiment of the present invention, one or both of the gripping means 21 and 22 comprise a sensor 223 positioned at the extremity, in the area where the two gripping means are in contact. This or these sensors, in combination with the relative motion between the gripping means 21 and 22, allow the detection of the level of roughness of the textile or material handled or manipulated by a gripper according to object of the present invention.

While the invention has been described in connection with the above described embodiments, it is not intended to limit the scope of the invention to the particular forms set forth, but on the contrary, it is intended to cover such alternatives, modifications, and equivalents as may be included within the scope of the invention. Further, the scope of the present invention fully encompasses other embodiments that may become obvious to those skilled in the art and the scope of the present invention is limited only by the appended claims.

The invention claimed is:

1. A gripper comprising:
   an external body (1);
   at least one driving unit housed within the external body, said driving unit actuating at least two sliding elements (11) according to a translational movement, such that said sliding elements (11) move away from and approach each other symmetrically with respect to a longitudinal mid-plane (A) of the gripper, passing from a maximum mutual approach condition to a maximum mutual spacing condition;
   at least two gripping members (21, 22) each connected to one of the sliding elements (11),
   wherein each of the gripping members (21, 22) is connected to one corresponding sliding element (11) through a first transmission group causing a translation movement from the sliding elements (11) to the gripping members (21, 22), and
   wherein the first transmission group comprises a kinematic chain (31, 32, 33 e 34) having levers that invert motion, such that, during the approaching condition of the sliding elements (11), the gripping members (21, 22) move away from each other and, during the spacing condition of the sliding elements (11), the gripping members (21, 22) approach each other, being the mutual spacing and approaching of the gripping members (21, 22) performed with respect to the longitudinal mid-plane (A); and
   a biasing element (5), positioned between the sliding elements (11), the biasing element (5) having a maximum compression condition corresponding to the maximum approach condition of the sliding elements (11), and a condition of maximum extension corresponding to the condition of maximum spacing of the sliding elements (11).

2. The gripper according to claim 1, further comprising a second transmission group positioned between the first transmission group and the two gripping members (21, 22), the second transmission group being connected to the first transmission group through revolute joints, such that the second transmission group has a rotation with respect to the first transmission group according to an axis parallel to the longitudinal mid-plan (A).

3. The gripper according to claim 2, wherein the second transmission group comprises a kinematic chain (41, 42 e 43) having levers providing for a relative motion between the gripping members (21, 22) at least in a direction parallel to the longitudinal mid-plane.

4. The gripper according to claim 3, wherein the levers of the first transmission group and the levers of the second transmission group are co-planar along a pivoting plane (B), causing their respective pivoting axis to be parallel to each other, perpendicular to the pivoting plane (B), and parallel to the longitudinal mid-plane (A), and wherein the second transmission group is operatively connected to the external body (1) through a support frame (12).

5. The gripper according to claim 4, wherein the second transmission group comprises two symmetrical parts with respect to a plane perpendicular to the longitudinal mid-plane (A), each part having a sixth (41), a seventh (42) and an eighth (43) bracket, such that the seventh bracket (42) has two extremities connected respectively to one extremity of the sixth bracket (41) and one extremity of the eighth bracket (43), wherein the sixth bracket (41) is connected in rotation to the support frame (12) and the eighth bracket (43) is connected in rotation to an output bracket (34) of the first transmission group, and wherein the gripping members (21, 22) are respectively connected to the sixth bracket (41) and the eighth bracket (43).

6. The gripper according to claim 5, wherein the first transmission group comprises two symmetrical parts with respect to a plane perpendicular to the longitudinal mid-plane (A), each of the two symmetrical part comprising a first bracket (31) and a second bracket (32) of motion input of the sliding elements (11) that are opposed to each other, each of each of the first and second brackets being fixed to one of the two sliding elements (11), the first bracket (31) being connected to a third bracket (33) linked from its end to a fourth bracket (34) of motion output, the fourth bracket (34) of motion output being linked to the second bracket (32) of motion input, such that the fourth bracket (34) of motion output rotates with respect to the second bracket (32) along a rotation axis perpendicular to the pivoting plane (B).

7. The gripper according to claim 6, wherein the second transmission group comprises at least one elastic element (6) connected to the seventh bracket (42) and to the support frame (12) configured to regulate a relative motion between the gripping members (21, 22).

8. The gripper according to claim 6, further comprising an actuator located between the second transmission group and the support frame (12), the actuator being configured to regulate a relative motion between the gripping members (21, 22).

9. The gripper according to claim 1, wherein the gripping members (21, 22) comprise a first plate extending with a specific inclination with respect to the longitudinal mid-plane (A) and a second plate having a first part (221) extending toward the first plate, the first part being connected to a second part (222) that has an inclination different to the inclination of the first part (221) with respect to the longitudinal mid-plane (A), such that during the approaching condition of the gripping members (21, 22) the second part (222) is parallel to the first plate.

10. The gripper according to claim 9, wherein the second part (222) comprises a plate folded on itself.

11. The gripper according to claim 1, wherein the two gripping members (21, 22) include a contact sensor, placed in a contact area of the gripping members.

* * * * *